Aug. 17, 1943.  A. S. KROTZ  2,327,113
RESILIENT BUSHING AND METHOD OF MAKING THE SAME
Filed July 1, 1939  2 Sheets-Sheet 1
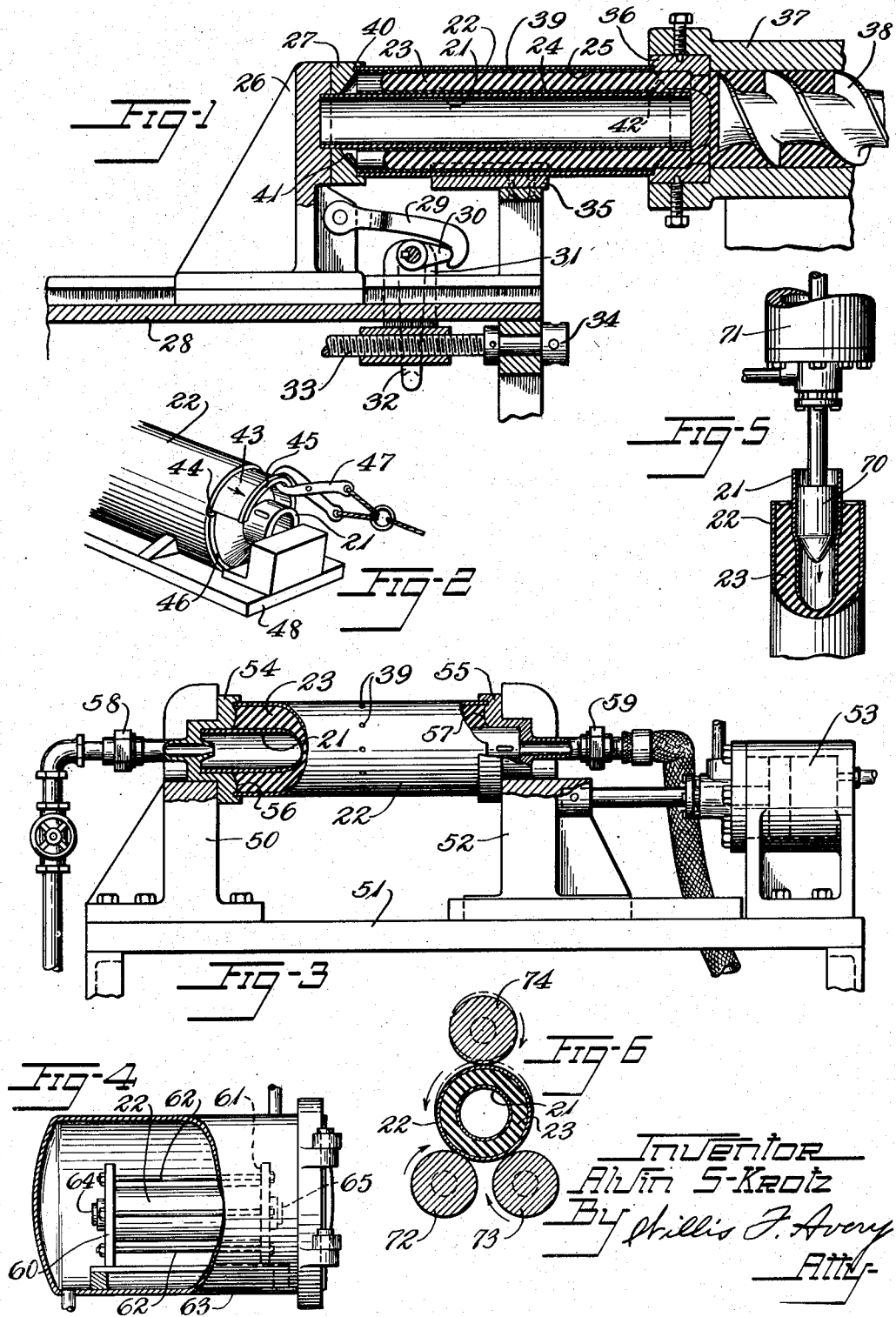
Inventor
Alvin S. Krotz Aug. 17, 1943.     A. S. KROTZ     2,327,113
RESILIENT BUSHING AND METHOD OF MAKING THE SAME
Filed July 1, 1939     2 Sheets-Sheet 2
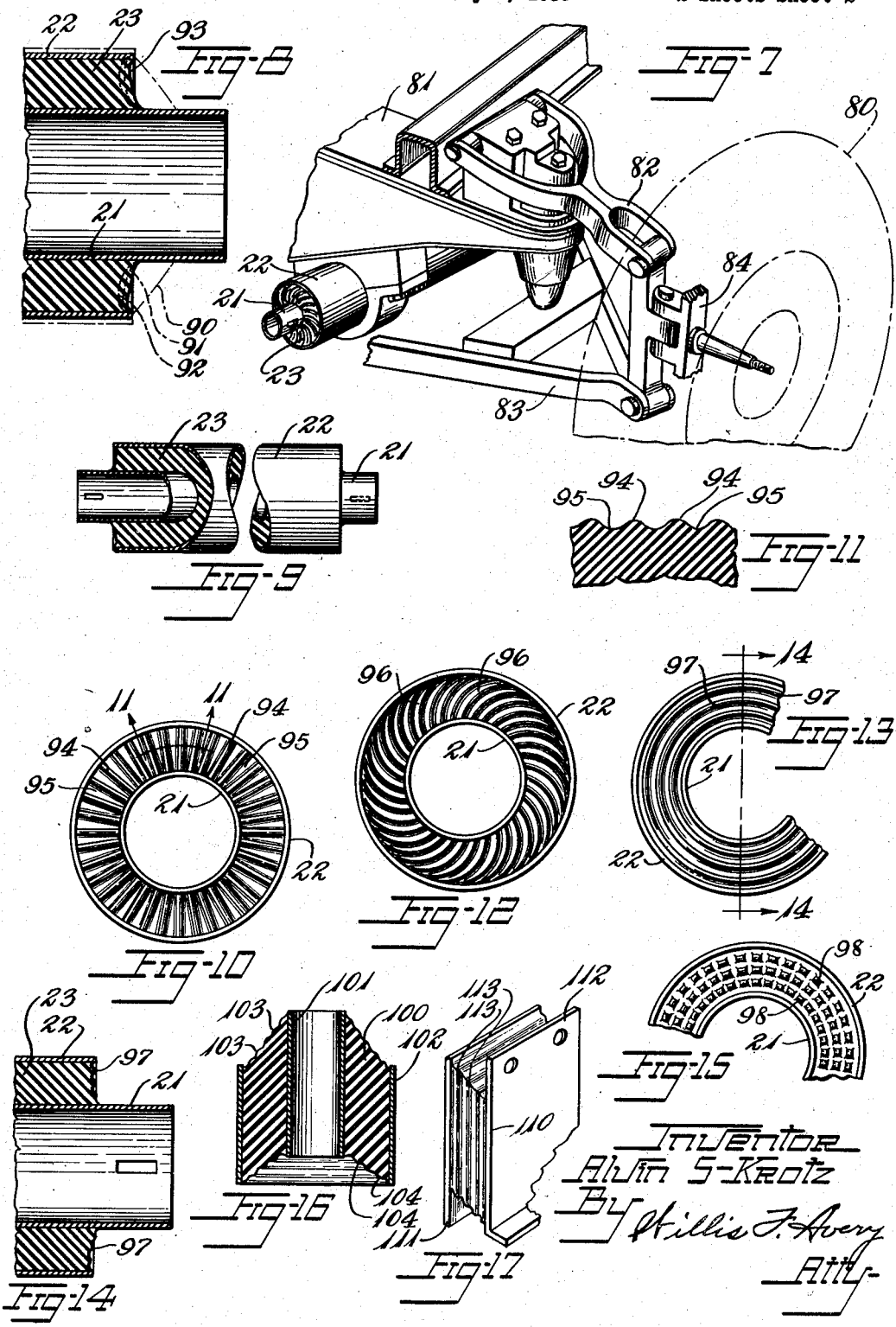

Patented Aug. 17, 1943

2,327,113

UNITED STATES PATENT OFFICE 2,327,113

RESILIENT BUSHING AND METHOD OF MAKING THE SAME

Alvin S. Krotz, Akron, Ohio, assignor to The B. F. Goodrich Company, New York, N. Y., a corporation of New York Application July 1, 1939, Serial No. 282,474

10 Claims. (Cl. 18—59)

This invention relates to resilient flexible connections and resilient bushings therefor in which the resilient element comprises a body of vulcanized rubber or other rubber-like resilient material secured between relatively movable rigid members, and it pertains more particularly to flexible connections or springs capable of large amplitudes of elastic deflection and therefore suitable for uses such as the suspension of vehicles.

The principal objects of the invention are to provide a spring of rubber-like material having great resistance to failure, to provide for great resistance to failure of the exposed surfaces of said material and of the bond between said material and the rigid members, and a further object, where the spring takes the form of an inner shaft member, an outer sleeve member, and a body of rubber-like material between these members, is to obtain these advantages where the inner and outer members may both be circumferentially continuous, and a further object is to provide procedure for making these springs and to provide apparatus for their manufacture, all with convenience and economy and with the results of uniform high quality of the product.

These and further objects will be apparent from the following description, reference being had to the accompanying drawings in which:

Fig. 1 is a side elevation, with parts broken away and sectioned, of apparatus for extruding rubber-like material into the annular opening between inner and outer members of a cylindrical spring, constructed according to and embodying the invention.

Fig. 2 is a perspective view of a supported spring at a stage in the manufacture thereof.

Fig. 3 is a side elevation, with parts broken away and sectioned, of apparatus for vulcanizing a cylindrical type spring in accordance with the invention.

Fig. 4 is a side elevation, with parts broken away and sectioned of apparatus for vulcanizing a cylindrical type spring without using a mold, by provisions for circulating steam outside the spring and inside the hollow shaft, in accordance with the invention.

Fig. 5 is a side elevation, with parts broken away and sectioned, of apparatus for expanding the inner member of a cylindrical type spring after vulcanization in accordance with the invention.

Fig. 6 is a vertical cross section of apparatus for rolling a cylindrical type spring to reduce its outer diameter after vulcanization, in accordance with the invention.

Fig. 7 is a perspective view of a cylindrical type spring as applied to the suspension of an automobile.

Fig. 8 is a longitudinal section of the end portion of a cylindrical type spring showing the end contour of the rubber-like material at various stages of production, in accordance with the invention.

Fig. 9 is a side view, with parts broken away and sectioned, of the cylindrical spring of Fig. 8.

Fig. 10 is an end view of a cylindrical-type spring showing an end construction to avoid wrinkling when the spring is used in torsion in accordance with the invention.

Fig. 11 is a section taken along the line 11—11 of Fig. 10.

Fig. 12 is a view like Fig. 10 but showing a modified construction.

Fig. 13 is a view like Fig. 10 but showing a further modified construction.

Fig. 14 is a longitudinal section of an end portion of the spring of Fig. 13.

Fig. 15 is a view like Fig. 10 but showing a still further modified construction.

Fig. 16 is a vertical section of a spring for axial deflection, constructed according to and embodying the invention.

Fig. 17 is a perspective view of a flat plate type of spring constructed according to and embodying the invention.

In accordance with the invention I provide convenient and economical method and apparatus for assembling and vulcanizing the spring and bonding in a manner productive of strength and uniform high quality in the product. Provision is made for vulcanizing the rubber-like material under pressure during at least a part of the vulcanizing period to obtain a good bond between the rubber-like material and the rigid metal members of the spring, the rigid members or metals then being modified in form or shape or relation to each other by permanent distortion of the metal to relieve or avoid shrinkage stresses caused by the cooling of the spring after vulcanization so that the exposed surfaces of rubber-like material shall not be drawn inwardly as a result of such shrinkage, and so that the junction surface between the rubber-like material and the metals shall not be placed under tension by such shrinkage. Preferably the shape of the metals or their relation to each other is so modified as to place the junction area between the rubber-like material and the metals under some compression, which has been found to add materially to the life and resistance to fatigue of the spring, but not so much as to cause undesirable bulging of the exposed faces of the spring.

The distortion of the metal is so proportioned that the exposed rubber-like material at the ends of the spring is filled out to a predetermined contour which will avoid or relieve stresses on the exposed surface but will not cause the exposed surface to bulge excessively or cause the rubber-like material to contact new areas of the metals. In addition, the exposed surface of rubber-like material is given such a contour as to take full advantage of the modification of the rigid members or metals of the spring in relieving surface stresses to avoid failure at exposed surfaces which has occurred in some prior constructions. Preferably the exposed surface is provided with ribs or other surface form so designed as to prevent objectionable wrinkling of the surface when the spring is flexed through large amplitudes in shear or torsion.

In Fig. 1 is illustrated apparatus for assembling a cylindrical spring or bushing comprising an inner hollow shaft 21, an outer circumferentially continuous sleeve 22 with an interposed body 23 of rubber or other resilient rubber-like material, the body 23 preferably being adhered by a vulcanized bond to both the shaft and the sleeve in the completed structure. A layer 24 of the gum to promote adhesion of the body to the metal may be used on the inner member, and a layer 25 of tie gum may be used on the outer member for like purpose, if desired.

A movable end plate 26 carrying a collar 27, adapted to close the end of the sleeve 22, is slidably mounted upon a support 28 and is adapted to be held against rearward movement by a latch 29 pivoted upon the end plate 26 and engageable with a locking member 30, the latter being pivotally mounted in a traveling bracket 31 and being operated by a handle 32 turning with the locking member. The bracket 31 is mounted by a threaded engagement upon a rotatable screw 33 for adjustably positioning the bracket, latch, and end plate 26 to accord with the desired length of the cylindrical spring. The screw 33 may be rotated by means of an apertured end collar 34 adapted to receive a suitable manipulating tool.

The outer sleeve 22 of the cylindrical bushing is centrally supported upon an upward extension 35 of the support 28, and the hollow shaft member 21 is supported at one end within the collar 27. At its other end the shaft 21 is supported within a spider 36 mounted within the mouth of an extruding machine 37. The spider 36 also engages the outer sleeve 22 closing the end of the bushing except for the space through the spider 36 through which rubber is forced by a screw 38 of the extruding machine. As the rubber is forced into the space between the inner shaft and the outer sleeve air escapes through apertures which may be in the form of bleed holes 39, or through slots 40, or corner spaces at the inner collar 27, or all of these.

Preferably the collar 27 and the spider 36 are provided with wall surfaces 41 and 42 of such form that some excess rubber is provided at the ends of the bushings.

Under some conditions it will not be necessary to use the layers 24 and 25 of tie gum on the shaft and sleeve respectively, although it is preferred to use the tie gum on the shaft at least, for strength. In some cases, a coating of cement on the surfaces of the sleeve is effective to provide adequate adhesion, and where cement only is used there may be a tendency for the rubber to wipe off the cement as it is forced into the bushing by the extruding machine. In this case thin metallic shields 43 and 44 may be inserted in the sleeve 22 before the rubber is forced into place, the shields being withdrawn after the extruding operation in the manner, for example, as is illustrated in Fig. 2. Preferably the shields are provided with end beads or flanges 45, 46 for engagement by tongs 47 to facilitate the removal, while the bushing is held in place in a cradle support 48. Similar shields of smaller size may be provided at the shaft for cases where cement is used in lieu of tie gum at the shaft.

After the bushing has been filled with rubber in a manner as hereinabove described it is ready for the molding and vulcanizing operation. In accordance with the invention I utilize the inner shaft and outer sleeve of the bushing itself as part of the mold, suitable enclosures being provided, so that by introducing heated fluid within the hollow shaft the rubber is molded and vulcanized in place without requiring additional mold members. In addition to simplicity this has the advantage also of applying the vulcanizing heat to the part of the bushing where it is most needed, namely the portion of the rubber adjacent the inner shaft where inadequate penetration of heat, as has resulted from some molding expedients used heretofore, is likely to result in uncured and poorly adhered rubber at the inner shaft. Because of the smaller bonding area at the inner shaft as compared with the outer sleeve a strong adhesion of the rubber to the inner shaft and a fully cured condition of the rubber in this region are especially desired and the present invention is advantageous in providing these results.

A suitable curing and molding apparatus for the purpose is illustrated in Fig. 3. One end standard 50 is rigidly mounted upon a support 51 and another end standard 52 is slidably mounted upon the support for adjustment according to the length of the bushing, the standard 52 being urged into molding position by fluid pressure in cylinder 53, preferably hydraulic, so as to maintain molding pressure against the ends of the bushing. The standards 50 and 52 are provided with respective end collars 54 and 55 for closing the annular space of the bushing between the shaft and the outer sleeve, which collars are provided with surfaces 56, 57 for molding the ends of the rubber to the desired contour.

The standards and end collars are apertured for suitable pipe connections 58, 59 for the introduction and exhausting of steam or other heating fluid into and from the hollow shaft of the bushing to effect vulcanization. Heavy molding pressure is assured by the provision of the excess rubber in the bushing, and under the molding pressure the rubber will be squeezed out at the end collars and through the bleed holes 39, these leakage openings however being so small that heavy molding pressure is maintained in the bushing. The end collars 54 and 55 preferably are provided with cylindrical skirts overlapping the outside of the sleeve 22 as shown to prevent the too free escape of the excess rubber to the end of maintaining high molding pressure.

An alternative method of molding and vulcanizing the bushing may be effected by the apparatus shown in Fig. 4 wherein the bushing is clamped between two end plates 60 and 61 by means of tie bolts 62, 62. The assembly is placed in a steam or other heated chamber 63, the ends of the hollow shaft member being left open at 64, 65 for access of the heating fluid to the inside of the shaft as well as to the outside of the sleeve 22. This manner of curing is especially suitable for bushings of considerable radial thickness in order to provide good heat penetration. The end plates 60 and 61, like the collars 54, 55 of the previously described embodiment, are provided with suitable surfaces for molding the ends of the bushing to the desired contour.

The molding procedures herein described have among their advantages the fact that in vulcanizing the cylindrical bushing by means of heat applied from inside the shaft effective vulcanization of the rubber at the shaft is accomplished and this is important since stresses are highest in the rubber next to the shaft when the bushing is subjected to stresses and therefore what may be referred to as a "tight" cure is particularly desirable near the shaft.

If desired the flow of the heating fluid during vulcanization may be increased gradually in such a manner as to provide some decrease in the specific gravity of the rubber-like material throughout the vulcanization period for the purpose of maintaining pressure against the bonding surface throughout a predetermined portion of the vulcanizing period to the end of producing increased bonding strength.

Further to increase the strength of the adhesion of the rubber to metal of the shaft and sleeve, and to overcome the effect of shrinkage of the rubber when it cools from the vulcanizing temperature, it is desirable to reduce the radial dimension of the bushing somewhat and preferably to place it under some radial compression. This may be accomplished, for example, as illustrated in Fig. 5 by expanding the inner shaft member of the bushing outwardly after the latter has been vulcanized. A mandrel 70 somewhat larger than the inner diameter of the shaft is forced into the bushing by suitable forcing means which as by means may comprise a fluid pressure cylinder 71 so that the inner shaft is expanded uniformly throughout its length. This operation is performed after cure and either before or after cooling and has the result of relieving or preventing strains in the rubber due to shrinkage during cooling, and it builds up pressure on the bonded surface between the rubber and the metal, and it also alters the end contour of the rubber in a manner described more fully hereinafter.

The outer sleeve 22 may be reduced in diameter to the same end, either as an alternative to the expansion of the shaft, or in addition thereto. This may be effected by means of a roller press such, for example, as is illustrated in Fig. 6. In this figure the bushing is supported upon two rollers 72, 73 and is pressed beneath a top roller 74. One or more of these rolls are driven, so that as the bushing is rotated its outer sleeve is reduced uniformly in diameter to reduce the radial thickness of the rubber bushing and relieve or prevent undesirable strains in the rubber.

A typical installation of the bushing as a torsion spring in an independent wheel suspension is illustrated in Fig. 7. A wheel 80 is supported from a frame 81 of the vehicle by upper and lower links 82 and 83 pivoted at their outer ends to a wheel supporting member 84 and at their inner ends to supports on the frame. The lower link 83 is secured at its inboard end to the inner shaft 21 of the bushing and the outer sleeve 22 of the bushing is clamped to the frame, the arrangement being such that vertical springing is effected through torsional stress in the rubber body 23 of the bushing. Such torsional stress may result in twisting the rubber through large angles accompanied by severe stresses at the end surfaces of the rubber.

To the end of enabling the end surfaces of the rubber to sustain these stresses in the most effective manner I mold such surfaces to predetermined contours. In Fig. 8 there is illustrated in longitudinal section the end portion of the cylindrical spring or bushing showing the end contour of the rubber at various stages of production. The contour shown at 90 is illustrative of the type of contour left when the uncured rubber is first introduced between the shaft and the outer shell, there being an excess of the rubber as hereinbefore described. Contour 91 is the contour of the end surfaces during the molding and curing operation, whether the molding is effected by means of the apparatus of Fig. 3 or of Fig. 4. This contour is preferably somewhat concave as shown. After curing and cooling, the contraction of the rubber as its density increases due to the cooling, causes the end contour to pull into a somewhat greater concavity as shown at 92, thereby placing tension on the exposed rubber surface. After the radial thickness of the bushing has been reduced either by expansion of the inner shaft or contraction of the outer sleeve, or both, the rubber is placed under some compression resulting in pressure on the surfaces of adhesion between the rubber and the metal and resulting further in a change of contour of the exposed end surfaces to that shown at 93 which is less concave than the original molded contour 91 and is preferably connected to the metal by end fillets as shown in Fig. 8, so that while the end is concave it is nearly flat. The operation by which the change in form of the metals is accomplished will usually be performed after the cured spring has cooled giving the sequence of end contours hereinabove described. However, this sequence may be varied to distort the shaft or sleeve or both while the spring is hot, following the curing, in which case the original contour 90 will be first as described then the molded contour 91 will result. After the radial compression has been imposed on the rubber the ends will bulge to a new contour somewhere between 93 and 90. After the bushing has cooled the contour will return to 93, the final contour arrived at by the first sequence described.

In Fig. 9 the completely molded and treated bushing is shown, ready for installation.

Fig. 10 illustrates one form of contour of the exposed rubber provided in accordance with this invention to prevent or reduce and control the tendency toward wrinkling of exposed rubber-like surfaces of a rubber spring under stress. In a spring where rubber-like material is attached to or adhered to opposing rigid surfaces, which are given a shear-like movement, as in the rotational movement of the inner shaft with relation to the outer sleeve in the torsion type spring herein described, there is a tendency for the end surfaces of the rubber-like material to take on surface-like material to take on surface wrinkles which extend outwardly from the shaft and slope or curve in the direction of torsional rotation. In seeking an explanation for these wrinkles, the exposed end of the rubber may be thought of as a very thin surface layer which, through the shearing movement of the inner and outer members, is subjected to tension in one direction and compression in another direction of such layer, roughly at 90° to the direction of tension. The result is a tendency for the surface to fold into wrinkles extending in the direction of the tensional force. In accordance with this invention I provide ribs or other suitable wave-like conformation in the exposed surface of rubber so placed that elastic displacements will cause a slight modification of the form of the ribs or other suitable conformation and will reduce or eliminate objectionable wrinkles. Since the conformations are made with a much larger radius at their root than the radius of the folds in a wrinkled rubber surface, and the surface therefore curves gradually rather than sharply, there is not the tendency to start surface failures which exists where the surface is not ribbed and is permitted to wrinkle. To the end of providing maximum curved surface in the grooves the concave curvature of the grooves may be made of greater radius than the convex curvature of the protuberances. In some cases the protuberances may be made even more or less pointed so long as the grooves are amply curved.

To this end the end surfaces of the rubber-like material may be formed with ribs 94, 94 extending radially as shown in Fig. 10, such ribs being separated by grooves 95, 95. Preferably the ribs and grooves merge in gradually curved surfaces as shown in section in Fig. 11. If desired the ribs may extend spirally as at 96, 96 in Fig. 12 or circumferentially as at 97, 97 in Figs. 13 and 14. Optionally the end surface of the rubber-like material may be formed with protuberances, in the form of nubs 98, 98 as shown in Fig. 15, which nubs may result from the intersection of grooves disposed radially and circumferentially or radially and spirally.

The wave-like surface conformation of the rubber-like material has advantage also in the shear type springs of types other than the torsion springs hereinabove discussed. In Fig. 16 is illustrated a cylindrical spring adapted for movements imposing vertical shear stresses on the rubber. A body 100 of resilient rubber-like material is disposed between inner and outer members 101, 102, preferably in vulcanized adhesion therewith. The upper surface of the body 100 is convex and the under surface is concave as shown to provide for vertical movement of the inner member 101 with respect to the outer member 102. In some cases both the upper and lower end faces of this type spring may be generally convex, as desired. The two end faces are formed with ribs or protuberances 103, 103 and 104, 104. While Fig. 16 illustrates the end conformation in the form of circumferential ribs, it will be understood that the protuberances may be of various shapes as hereinbefore discussed and yet obtain the advantages of avoiding undesirable wrinkling of the inner surface upon flexure of the bushing.

Fig. 17 shows a flat-plate shear type of spring, which may be considered as a segment of a cylindrical spring having extremely large radius such that portions of the inner and outer members are substantially flat. A body of rubber-like material 110 is sandwiched between parallel flat plates 111 and 112 preferably in vulcanized adhesion therewith, which plates are adapted to be mounted for relative vertical movement resisted resiliently by shear stresses in the body 110. One or more of the exposed surfaces of the body 110 may be provided with suitable formations to the end of avoiding objectionable wrinkling. While such conformations may take the form of any suitable ribs or protuberances, I prefer that these surfaces be formed with ribs 113, 113 parallel to the plates 111, 112 as shown and on all exposed faces of the material. The disposition of the ribs accommodates itself well to the shear movement of this type mounting, but good results may be obtained by providing the ribs transversely with relation to the side plates or by other suitable protuberances for the purpose.

Variations may be made without departing from the scope of the invention as it is defined in the following claims.

I claim:

1. The method of making a resilient bushing which comprises molding a body of rubber-like material upon an inner member and within an outer sleeve member and with the end faces of said body concave, the margins of such faces at said members projecting beyond the intermediate portions of said faces, and altering the radial dimension of at least one of said members to reduce the radial extent of the space therebetween without however compressing said body to an extent such as to cause bulging of said end faces to a convex shape.

2. The method of making a resilient bushing which comprises molding a body of rubber-like material upon a circumferentially continuous inner member and within a circumferentially continuous outer sleeve member, and with the end faces of said body concave, the margins of such faces at said members projecting beyond the intermediate portions of said faces, and altering the radial dimension of at least one of said members to reduce the radial extent of the space therebetween without however compressing said body to an extent such as to cause bulging of said end faces to a convex shape.

3. The method of making a resilient bushing which comprises molding a body of rubber-like material upon an inner member and within an outer sleeve member and with the end faces of said body concave, the margins of such faces at said members projecting beyond the intermediate portions of said faces, and altering the radial dimension of at least one of said members to reduce the radial extent of the space therebetween without however causing the rubber-like material to contact new surfaces of said members.

4. A cylindrical torsion-spring comprising an inner member, an outer sleeve member, said members being adapted for relative rotational movement, and a body of resilient rubber-like material mounted between said members to resist such rotational movement by torsional stress in said rubber-like material and having exposed end faces, said rubber-like material having a plurality of wave-like protuberances in continuous rubber-like material of said end faces to resist objectionable wrinkling in said faces when the spring is stressed torsionally.

5. A cylindrical torsion-spring as defined in claim 4 in which the said wave-like protuberances are ribs extending radially in said end faces.

6. A cylindrical torsion-spring as defined in claim 4 in which the said wave-like protuberances are ribs extending circumferentially in said end faces.

7. A cylindrical torsion-spring as defined in claim 4 in which the said wave-like protuberances are ribs extending spirally in said end faces.

8. A cylindrical torsion spring as defined in claim 4 in which the said wave-like protuberances are spaced-apart nubs discontinuous both radially and circumferentially of said end faces.

9. A cylindrical torsion spring comprising an inner member, an outer sleeve member, said members being adapted for relative rotational movement, and a body of resilient rubber-like material mounted between said members to resist such rotational movement by torsional stress in said rubber-like material, said body having concave end faces in which the margins of said faces at both said members extend beyond the intermediate portions of said faces, and said faces having a plurality of wave-like protuberances to resist objectionable wrinkling in such faces when the spring is stressed torsionally.

10. A resilient mounting comprising spaced-apart members, and a body of resilient rubber-like material mounted between said members for movement of one member with relation to the other by shear stress in said body, said body having an exposed face formed with wave-like protuberances of said material in the form of spaced-apart nubs in said face, each isolated from other nubs in all directions along said face adapted to resist objectionable wrinkling of said face when the mounting is stressed in shear to distort said face.

ALVIN S. KROTZ.

CERTIFICATE OF CORRECTION.

Patent No. 2,327,113.　　　　　　　　　　　　　　　August 17, 1943.

ALVIN S. KROTZ.

It is hereby certified that error appears in the printed specification of the above numbered patent requiring correction as follows: Page 2, first column, line 28, for "the" second occurrence, read --tie--; page 3, second column, line 65-66, strike out "surface-like material to take on"; and that the said Letters Patent should be read with this correction therein that the same may conform to the record of the case in the Patent Office.

Signed and sealed this 11th day of January, A. D. 1944.

(Seal)　　　　　　　　　　　　　　　　　　　　　Henry Van Arsdale,
　　　　　　　　　　　　　　　　　　　　　　　Acting Commissioner of Patents.